United States Patent
Tombe (10) Patent No.: US 8,783,725 B2
(45) Date of Patent: Jul. 22, 2014

(54) RESTRAINT DEVICE

(75) Inventor: Hideyuki Tombe, Minato-ku (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/594,501

(22) Filed: Aug. 24, 2012

(65) Prior Publication Data

US 2013/0049341 A1 Feb. 28, 2013

(30) Foreign Application Priority Data

Aug. 25, 2011 (JP) ................................. 2011-183413

(51) Int. Cl.
*B60R 22/343* (2006.01)
*B60R 22/46* (2006.01)

(52) U.S. Cl.
USPC ............ 280/807; 297/477; 297/479; 701/45

(58) Field of Classification Search
USPC .......... 280/807; 701/45, 46, 47; 297/477, 479
See application file for complete search history.

(56) References Cited

U.S. PATENT DOCUMENTS

| | | | |
|---|---|---|---|
| 8,547,119 B2 * | 10/2013 | Ikuta et al. ................ | 324/686 |
| 2005/0082410 A1 * | 4/2005 | Tanaka et al. ............. | 242/390.8 |
| 2007/0199758 A1 * | 8/2007 | Saito et al. ................ | 180/268 |
| 2010/0125392 A1 * | 5/2010 | Takao et al. ............... | 701/45 |
| 2011/0035115 A1 * | 2/2011 | Schumacher .............. | 701/45 |
| 2011/0153165 A1 * | 6/2011 | Bolton et al. .............. | 701/45 |
| 2011/0270493 A1 * | 11/2011 | Tanaka ....................... | 701/45 |
| 2012/0221210 A1 * | 8/2012 | Adolfsson et al. ......... | 701/45 |
| 2012/0326487 A1 * | 12/2012 | Tonbe ........................ | 297/475 |
| 2013/0041559 A1 * | 2/2013 | Odate ......................... | 701/45 |
| 2013/0049340 A1 * | 2/2013 | Tombe ........................ | 280/807 |
| 2013/0049341 A1 * | 2/2013 | Tombe ........................ | 280/807 |
| 2013/0060428 A1 * | 3/2013 | Battlogg et al. ........... | 701/45 |

FOREIGN PATENT DOCUMENTS

| | | |
|---|---|---|
| JP | 2005-028970 | 2/2005 |
| JP | 2008-001265 | 1/2008 |
| JP | 2008-030668 | 2/2008 |
| JP | 2008-179260 | 8/2008 |

* cited by examiner

*Primary Examiner* — Karen Beck
(74) *Attorney, Agent, or Firm* — Foley & Lardner LLP (57) ABSTRACT

When releasing a connection between a motor and a spool, the value of a drive voltage is increased at start-up of the motor. After the rotating shaft of the motor starts rotating, the value of the drive voltage is set to a minimum value necessary to maintain the rotation of the rotating shaft. By this means, it is possible to prevent the number of revolutions of the rotating shaft of the motor from increasing unnecessarily and reduce the sound produced from the motor.

9 Claims, 7 Drawing Sheets

RESTRAINT DEVICE

CROSS-REFERENCE TO RELATED APPLICATION

This application claims the benefit of Japanese Patent Application No. 2011-183413, filed on Aug. 25, 2011, the entire disclosure of which is incorporated by reference herein.

FIELD

This application relates generally to restraint devices, and more particularly, to a restraint device for restraining the occupants of a vehicle.

BACKGROUND

Vehicles represented by cars are each provided with seatbelts to protect occupants from unpredictable accidents such as a sudden stop or collision. As such seatbelts, three-point seatbelts that are easy to fit and that exert a relatively high restraining force are commonly used.

The three-point seatbelts are provided with a retractor that winds up a belt to restrain an occupant. This retractor may be provided with a motor for adjusting the tension of the belt in accordance with the force that applies to the occupant. The motor is mechanically connected to a spool for winding up the belt when adjusting the tension of the belt. When there is no need to restrain the occupant such as when the vehicle has been stopped, the motor is disconnected from the spool.

In general, the motor and the spool are connected mechanically through a plurality of gears and a clutch. When the motor and the spool are connected, or when this connection is released, the motor is driven by a relatively strong force. This may cause the occupant to have an uncomfortable feeling due to the sound produced from the motor or the operating sound of the clutch.

So, various techniques have been proposed to reduce the sound produced from the clutch operation.

The device described in Unexamined Japanese Patent Application Kokai Publication No. 2008-30668 supplies a motor's maximum allowable current to the motor when disconnecting the motor and a spool by operating a clutch. This shortens the time required for the clutch operation, and results in reducing the time the clutch operating sound is produced.

The device described in Unexamined Japanese Patent Application Kokai Publication No. 2005-28970 operates a clutch by supplying to a motor a current of a smaller value than the value of the current that is supplied to the motor to rotate a spool. By this means, when operating the clutch, the number of revolutions of the motor is prevented from increasing significantly, which results in reducing the clutch operation sound.

Motors generally require great power at start-up, but, once started, motors do not require much power. So, like the devices described above, when the value of the current that flows in the motor to operate the clutch is kept constant, the number of revolutions of the motor may increase unnecessarily. In this case, a relatively large sound is continuously produced from the motor.

The present invention has been made in view of the above-described backgrounds, and it is therefore an object of the present invention to operate a clutch accurately and reduce the sound produced from the clutch operation.

SUMMARY

To achieve the above-described object, a restraint device according to the present invention provides a restraint device for restraining an occupant seated in a seat, comprising:

a spool that winds up a belt for restraining the occupant;
a motor that rotates the spool;
a gear unit that transmits an output of the motor to the spool;
a clutch that mechanically connects the motor and the gear unit through the rotation of the motor; and
a supply unit that supplies power to the motor so that, when the connection between the motor and the gear unit by the clutch is released, first power that is supplied at start-up of the motor is greater than second power that is supplied after the motor starts.

The supply unit may supply power to the motor so that an average value of the output voltage when the first power is supplied is greater than an average value of the output voltage when the second power is supplied.

The supply unit may supply power to the motor so that the current that is supplied at start-up of the motor is greater than the current that is supplied after the motor starts.

The supply unit may perform PWM control.

The supply unit may supply the first power for a predetermined time.

The restraint device according to the present invention may further comprise a first detection system that detects the start-up of the motor, and the supply unit may supply the first power until the first detection system detects the start-up of the motor.

The restraint device according to the present invention may further comprise a second detection system that detects that the motor and the gear unit are disconnected and the supply unit may stop the power supply when the second detection system detects that the motor and the gear unit are disconnected.

The restraint device according to the present invention may further comprise a second detection system that detects that the motor and the gear unit are disconnected and, when the second detection system detects that the motor and the gear unit are disconnected, the supply unit may supply power to the motor so that an average value of the output voltage when the first power is supplied is greater than an average value of the output voltage when the second power is supplied.

The spool may be placed on one side of the seat, and the restraint device of the present invention may further comprise:

a fixing member that is placed on one side of the seat and fixes one end of the belt pulled from a retractor;
a support member that supports the belt between the spool and the fixing member;
a buckle that is placed on the other side of the seat; and
a tongue that is provided in the belt and is attachable and detachable to and from the buckle.

BRIEF DESCRIPTION OF THE DRAWINGS

A more complete understanding of this application can be obtained when the following detailed description is considered in conjunction with the following drawings, in which.

DETAILED DESCRIPTION

Figure 1:
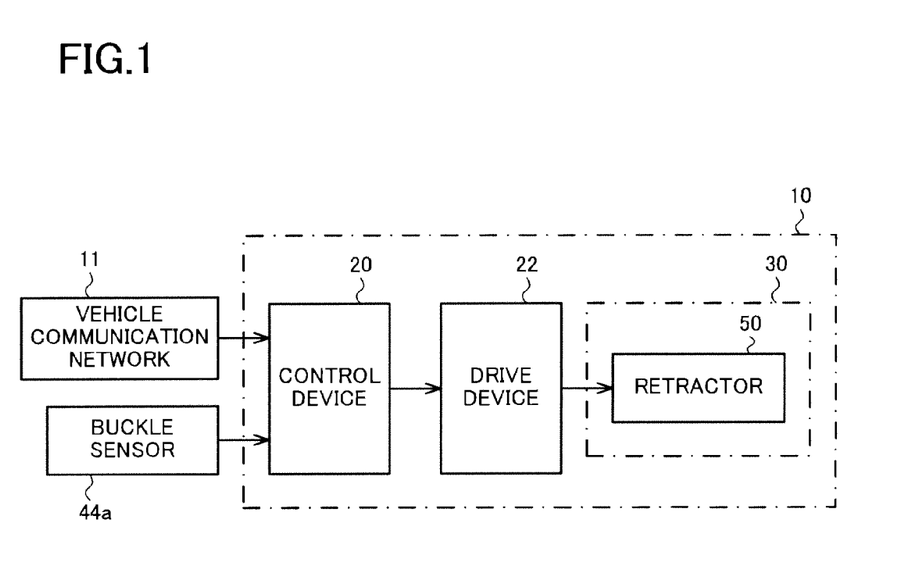
FIG. 1 is a block diagram of a restraint device according to the present embodiment.

Now, an embodiment of the present invention will be described below with reference to the accompanying drawings. FIG. 1 is a block diagram of a restraint device 10 according to the present embodiment. The restraint device 10 is a device that adequately holds the occupant in accordance with the acceleration of the vehicle in the traveling direction and in a direction orthogonal to the traveling direction. Hereinafter, it is assumed that the traveling direction of the vehicle is the X-axis direction and the direction orthogonal to the traveling direction is the Y-axis direction, for ease of description.

As illustrated in FIG. 1, the restraint device 10 includes a restraining unit 30 for restraining the occupant, a control device 20 that detects the traveling state of the vehicle based on an output from a vehicle communication network 11 or a buckle sensor 44a, and a drive device 22 that drives a retractor 50 of the restraining unit 30 based on commands from the control device 20.

The vehicle communication network 11 is, for example, an on-vehicle network such as CAN (Controller Area Network), LIN (Local Interconnect Network) or K-LINE. The control unit or the like of the vehicle can acquire information about, for example, the speed of the vehicle, the acceleration of the vehicle in the X-axis direction (traveling direction), and the acceleration of the vehicle in the Y-axis direction (direction perpendicular to the traveling direction), by communicating with the vehicle communication network 11.

Figure 2:
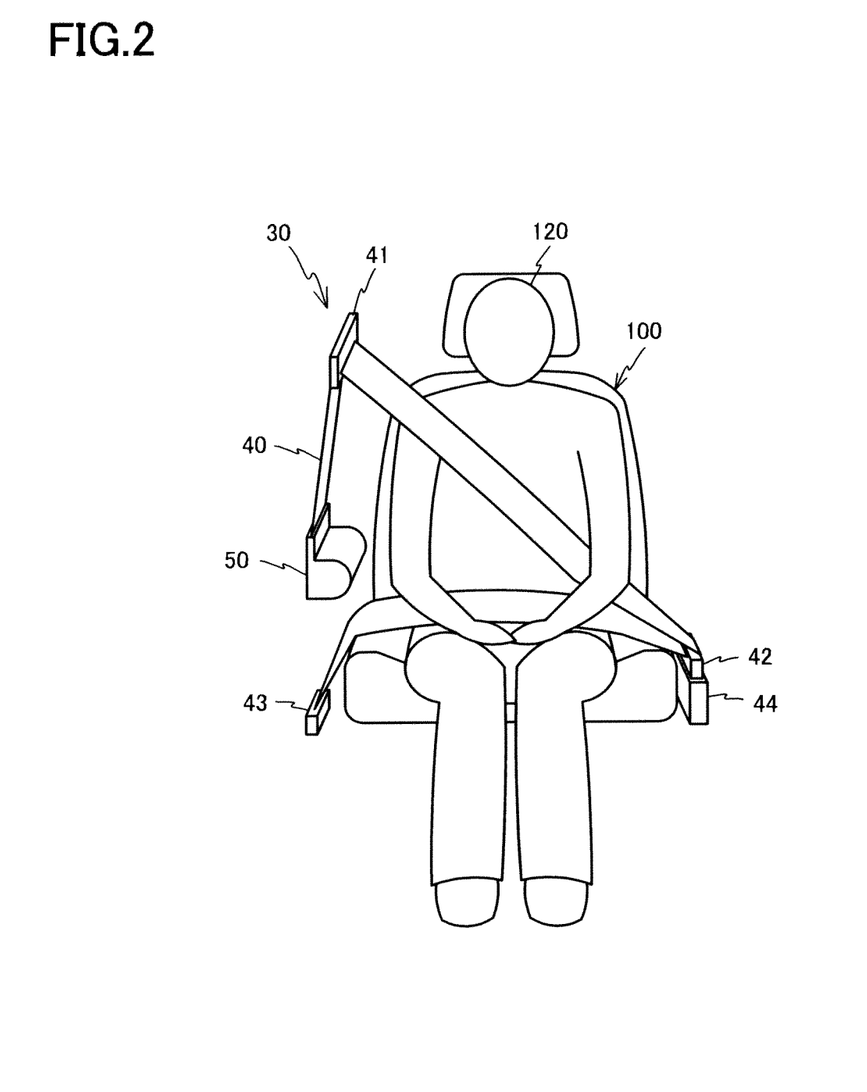
FIG. 2 is a diagram illustrating the restraint device.

FIG. 2 is a diagram illustrating the restraining unit 30 for restraining an occupant 120 seated in a seat 100. As illustrated in FIG. 2, the restraining unit 30 is a three-point seatbelt. This restraining unit 30 includes a belt 40 that restrains the occupant 120, and a retractor 50 that is placed on the right of the seat 100 and winds up and accommodates the belt 40.

Most part of the belt 40 constituting the restraining unit 30 is normally wound up by the retractor 50. The distal end of the belt 40 pulled from the retractor 50 is routed to the right side of the seat bottom of the seat 100, via a guide 41 fixed to a B pillar of the vehicle, and fixed to an anchor 43. When a tongue 42 provided in the belt 40 located between the guide 41 and the anchor 43 is attached to a buckle 44 by the occupant 120, the occupant 120 is restrained by the restraining unit 30.

The buckle sensor 44a illustrated in FIG. 1 detects whether or not the tongue 42 is attached to the buckle 44. The buckle sensor 44a is, for example, a limit switch having a point of contact that is on when the tongue 42 is attached to the buckle 44.

Figure 3:
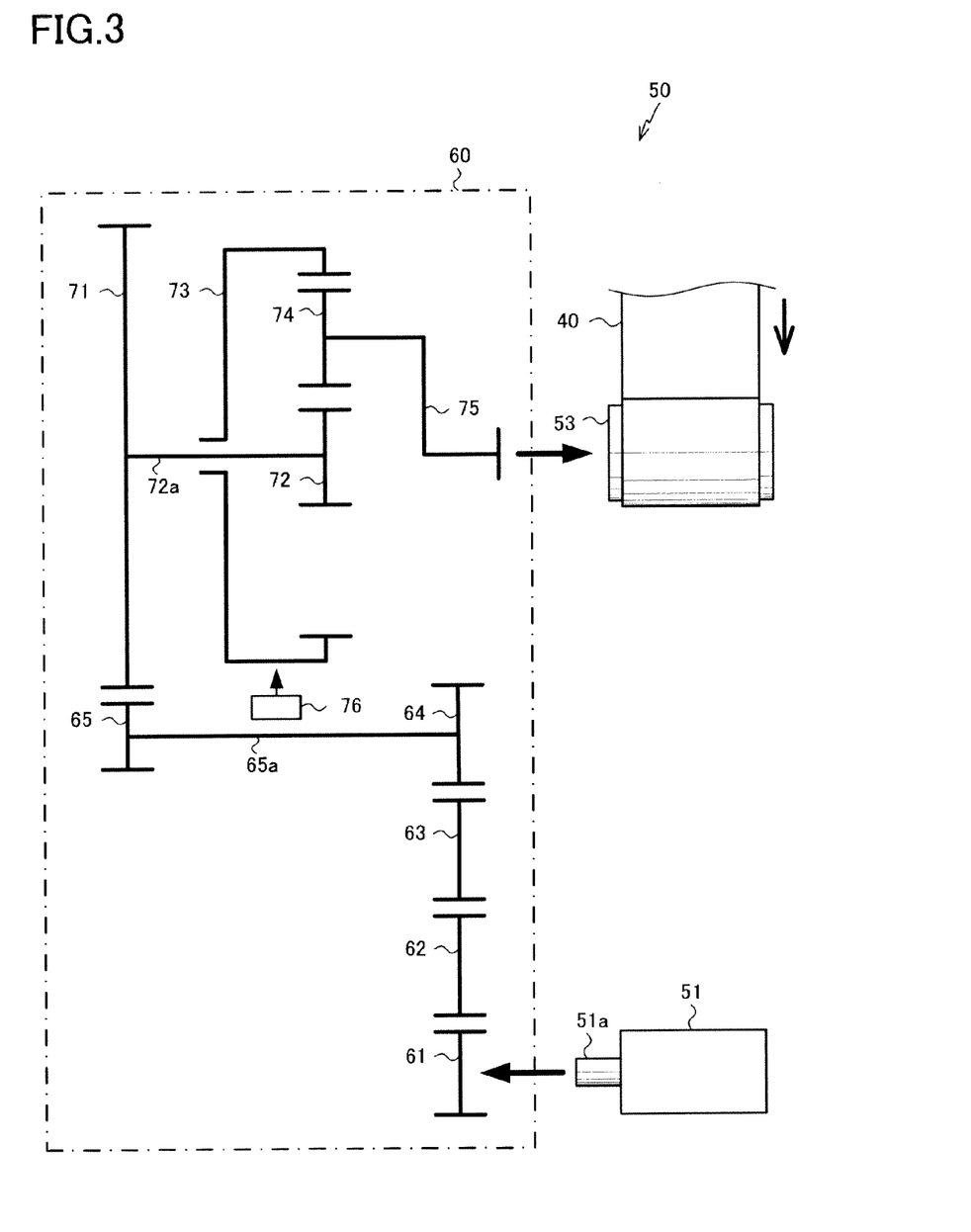
FIG. 3 is a diagram schematically illustrating a configuration of a retractor.

FIG. 3 is a diagram schematically illustrating a configuration of the retractor 50. As illustrated in FIG. 3, the retractor 50 includes a spool 53 for winding up the belt 40, a motor 51 for rotating the spool 53 and a gear unit 60 that transmits the output of the motor 51 to the spool 53.

The spool 53 is a cylindrical member. This spool 53 is mechanically connected with the motor 51 via the gear unit 60.

The motor 51 is, for example, a DC motor having a rated voltage of 12 V. Upon receiving power from the control device 20 as supply, this motor 51 rotates the gear constituting the gear unit 60.

Figure 4:
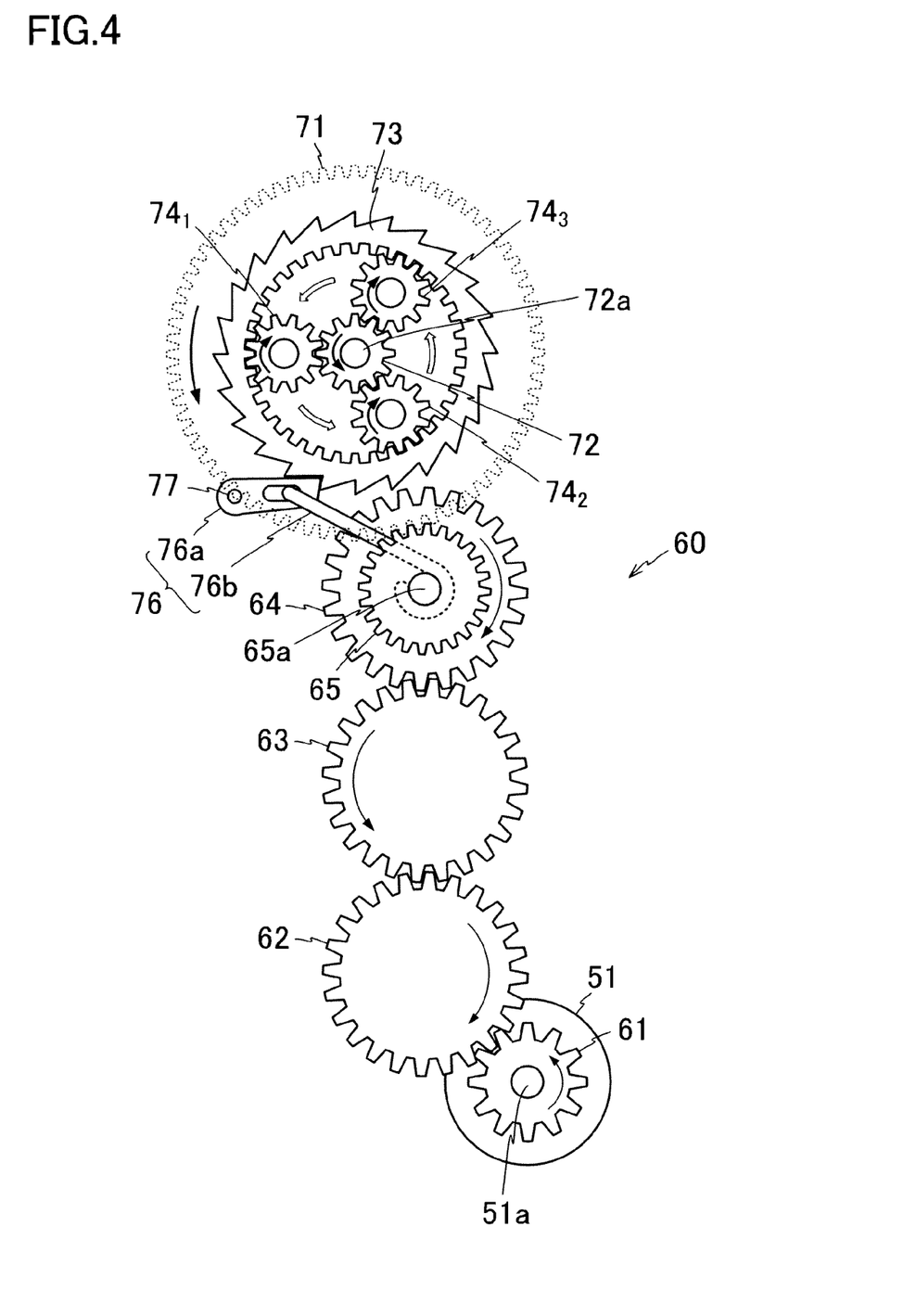
FIG. 4 is a diagram illustrating a gear unit.

FIG. 4 is a diagram illustrating the gear unit 60. As is apparent from FIG. 4 and FIG. 3, the gear unit 60 is formed with a spool drive system (71 to 74) that is made up of a sun gear 72, three planetary gears 74, an internal gear 73 and a slave gear 71 connected to the sun gear 72, a first drive gear 61 that is fixed to a rotating shaft 51a of the motor 51, a transmission system (62 to 65) that is made up of a first intermediate gear 62, a second intermediate gear 63 and a third intermediate gear 64, and a second drive gear 65 connected to the third intermediate gear 64 via a rotating shaft 65a, a clutch 76 for mechanically connecting the drive system and the transmission system, and a casing (not illustrated) that accommodates the above-described parts.

The first drive gear 61 is fixed to the rotating shaft 51a of the motor 51. When the motor 51 rotates forward, the first drive gear 61 rotates in the direction shown by the arrow.

The first intermediate gear 62 is a gear that engages with the first drive gear 61. The first intermediate gear 62 rotates as the first drive gear 61 rotates. When the motor 51 rotates forward, the first intermediate gear 62 rotates in the direction shown by the arrow.

The second intermediate gear 63 is a gear that engages with the first intermediate gear 62. The second intermediate gear 63 rotates as the first intermediate gear 62 rotates. When the motor 51 rotates forward, the second intermediate gear 63 rotates in the direction shown by the arrow.

The third intermediate gear 64 is a gear that engages with the second intermediate gear 63. The third intermediate gear 64 rotates as the second intermediate gear 63 rotates. When the motor 51 rotates forward, the third intermediate gear 64 rotates in the direction shown by the arrow.

By being connected with the third intermediate gear 64 via the rotating shaft 65a, the second drive gear 65 is integrated with the third intermediate gear 64. This second drive gear 65 is integrated with the third intermediate gear 64 and rotates around the rotating shaft 65a.

The slave gear 71 is a gear that engages with the second drive gear 65. The slave gear 71 rotates as the second drive gear 65 rotates. When the motor 51 rotates forward, the slave gear 71 rotates in the direction shown by the arrow.

As is apparent from FIG. 3, the sun gear 72 is integrated with the slave gear 71 by being connected with the slave gear 71 via a rotating shaft 72a. The sun gear 72, integrated with the slave gear 71, rotates around the rotating shaft 72a. As illustrated in FIG. 4, when the motor 51 rotates forward, the sun gear 72 rotates in the direction shown by the arrow.

The three planetary gears $74_1$, $74_2$ and $74_3$ are gears that engage with the sun gear 72. When the motor 51 rotates forward, these planetary gears 74 rotate relatively, around the sun gear 72 in the direction shown by the blank arrows. The three planetary gears 74 are mutually connected by a carrier 75, as is apparent from FIG. 3.

The internal gear 73 is an annular gear provided with internal teeth that internally engage with the planetary gears 74. Ratchet teeth to inhibit the clockwise rotation in FIG. 4 are formed on the outer edge of the internal gear 73.

The clutch 76 is formed with a pawl 76a and a wire 76b. The pawl 76a is rotatably supported by, for example, a casing or support member (not illustrated) so that one end thereof can rotate around a rotating shaft 77.

One end of the wire 76b is wound around the rotating shaft 65a of the third intermediate gear 64 and the second drive gear 65. The other end is inserted in a long hole provided in the pawl 76a. When the motor 51 rotates forward, the wire 76b rotates clockwise around the rotating shaft 65a, causing the pawl 76a to rotate counterclockwise. Furthermore, when the motor 51 rotates backward, the wire 76b rotates counterclockwise around the rotating shaft 65a, causing the pawl 76a to rotate clockwise.

As is apparent from FIG. 3 and FIG. 4, with the gear unit 60 configured as described above, when the motor 51 rotates forward, the first drive gear 61 rotates. The torque of the motor 51 then sequentially transmits to the first intermediate gear 62, the second intermediate gear 63 and the third intermediate gear 64, and the rotating shaft 65a rotates in the direction shown by the arrow. By this means, as illustrated in FIG. 4, the pawl 76a engages with the ratchet teeth of the internal gear 73, regulating the clockwise rotation of the internal gear 73.

When the motor 51 continues to rotate forward with the pawl 76a being engaged with the ratchet teeth of the internal gear 73, the planetary gears 74 rotate in the direction shown by the blank arrows. By this means, as is apparent from FIG. 3, the carrier 75 rotates and causes the spool 53 to rotate. As a result, the belt 40 is wound up around the spool 53.

Figure 5:
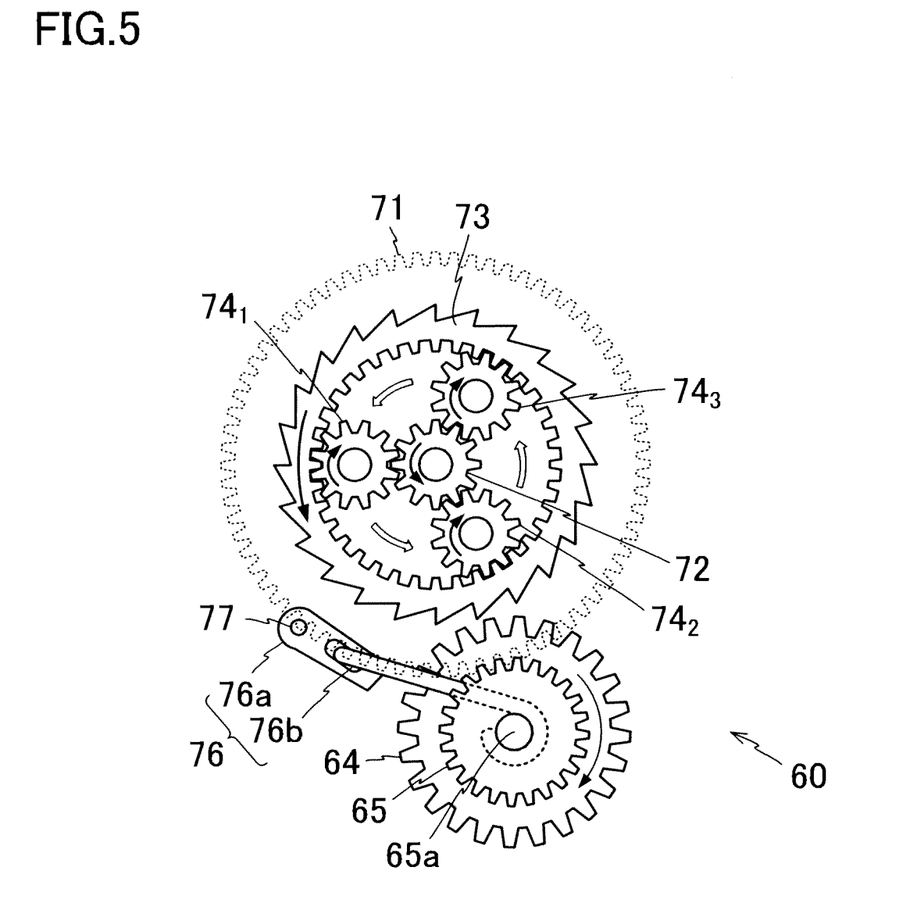
FIG. 5 is a diagram illustrating part of the gear unit.

Furthermore, when the motor 51 rotates backward and the rotating shaft 65a rotates in the direction opposite to the direction shown by the arrow, as illustrated in FIG. 4, the pawl 76a engaged with the ratchet teeth of the internal gear 73 rotates up to the position illustrated in FIG. 5. This unlocks the regulation of the rotation of the internal gear 73 and places the internal gear 73 in a released state.

After the internal gear 73 is released, the spool 53 connected to the carrier 75 does not rotate even if the motor 51 rotates. Consequently, the spool 53 can rotate independently of the motor 51.

That is, when the pawl 76a of the clutch 76 engages with the ratchet teeth of the internal gear 73, the motor 51 and the spool 53 are mechanically connected. Furthermore, when the pawl 76a of the clutch 76 is detached from the ratchet teeth of the internal gear 73 and the internal gear 73 is released, the motor 51 and the spool 53 are mechanically detached.

Hereinafter, for convenience of description, suppose the state in which the pawl 76a of the clutch 76 is engaged with the ratchet teeth of the internal gear 73 will be simply referred to as a state in which the clutch 76 is "on." On the other hand, the state in which the pawl 76a of the clutch 76 is detached from the ratchet teeth of the internal gear 73 will be simply referred to as a state in which the clutch 76 is "off."

The control device 20 is, for example, a computer provided with a CPU, a main storage used as a working area of the CPU and an auxiliary storage that stores a program executed by the CPU and various parameters. This control device 20 acquires vehicle information such as the speed and acceleration of the vehicle by communicating with the vehicle communication network 11. Furthermore, the control device 20 determines via the buckle sensor 44a whether or not the occupant 120 is restrained to the seat 100 by the belt 40. When, for example, the vehicle is stopped, and the occupant 120 does not have to be restrained, the control device 20 commands the drive device 22 to perform an operation to release the restraint of the occupant 120 (releasing operation).

The drive device 22 is configured to include a switching element for performing PWM (Pulse Width Modulation) control over the motor 51. The drive device 22 generates a voltage signal V of a duty ratio in accordance with the traveling state reported from the control device 20, and supplies the voltage signal V to the motor 51. For example, this voltage signal V is a signal to drive the motor 51 when adjusting the tension of the belt 40 or operating the clutch 76.

Figure 6:
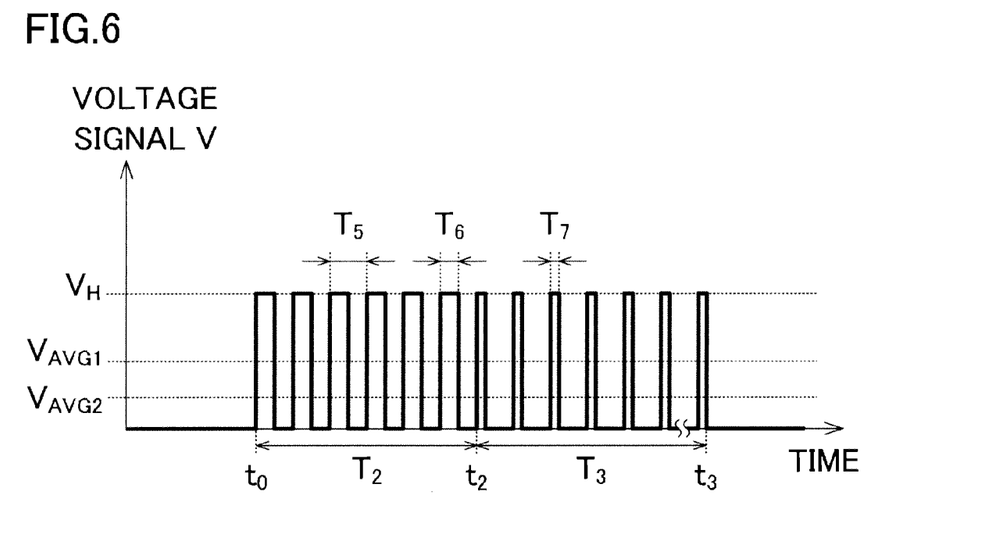
FIG. 6 is a diagram illustrating a voltage signal.

When performing a releasing operation to make the clutch 76 off, the drive device 22 supplies the voltage signal V having the waveform illustrated in FIG. 6, to the motor 51. This voltage signal V has a maximum voltage of $V_H$ and a period of $T_5$. The duty ratios $T_6/T_5$ and $T_7/T_5$ of the voltage signal V are adjusted such that the voltage signal V is periodically set to high level for time $T_6$ from time $t_0$ to time $t_2$ and the voltage signal V is periodically set to high level for time $T_7$ from time $t_2$ to time $t_3$. Time $t_0$ is the time at which the releasing operation starts. Furthermore, time $t_2$ is the time when time $T_2$ has elapsed since time $t_0$. Furthermore, time $t_3$ is the time when time $T_3$ has elapsed since time $t_2$.

To be more specific, the duty ratio $T_6/T_5$ is set such that the voltage to be calculated by multiplying the maximum voltage $V_H$ by the duty ratio $T_6/T_5$ becomes $V_{AVG1}$. The voltage $V_{AVG1}$ is a voltage sufficiently greater than the minimum operating voltage of the motor 51. On the other hand, the duty ratio $T_7/T_5$ is set such that the voltage to be calculated by multiplying the maximum voltage $V_H$ by the duty ratio $T_7/T_5$ becomes $V_{AVG2}$. The voltage $V_{AVG2}$ is a voltage smaller than the minimum operating voltage of the motor 51.

Figure 7:
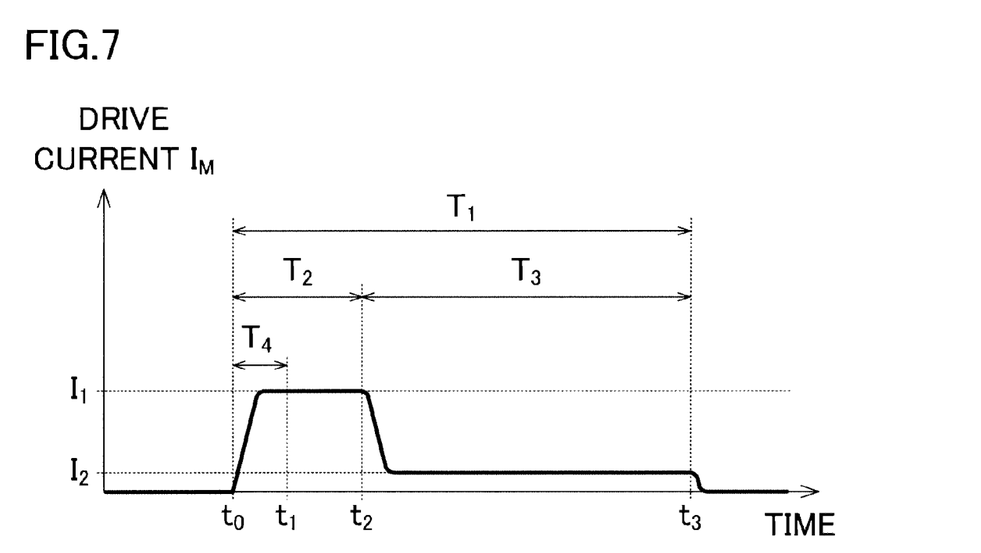
FIG. 7 is a diagram illustrating transition of a drive current that flows in a motor.

FIG. 7 illustrates a curve illustrating the transition of the drive current $I_M$ flowing in the motor 51 when the voltage signal V illustrated in FIG. 6 is supplied. Regarding the polarity of the current, suppose the direction of the current that flows in the motor 51 when the clutch 76 becomes off is + (positive). The drive current $I_M$ starts rising at time $t_0$ at which the releasing operation starts, and its value is kept to $I_1$ until time $t_2$ when time $T_2$ has elapsed since time $t_0$. From time $t_2$ onward, its value becomes a value b smaller than the value $I_1$. The value becomes nearly 0 at time $t_3$ after a lapse of time $T_3$ from time $t_2$.

Time $T_1$ required for the above-described releasing operation is approximately 200 msec. Furthermore, time $T_2$ and time $T_3$ are approximately 75 msec and 125 msec, respectively. Above-described time $T_2$ is the time resulting from adding a margin to average time $T_4$ required after starting supplying power to the motor 51 until the clutch 76 becomes off. For example, time $T_4$ is approximately 20 msec. Thus, the clutch 76 off normally becomes off before the elapse of 75 msec (=time $T_2$) since time $t_0$ when the operation starts. Times $T_4$ and $T_2$ are determined by the specifications of the motor 51 and the clutch 76.

Furthermore, the value $I_1$ is greater than the value of the current that flows in the motor 51 when a minimum operating voltage is applied to the motor 51. The value $I_2$ is a current that flows in the motor 51 when the minimum voltage ($V_{AVG2}$) necessary to drive the motor 51 is applied.

As described so far, with the present embodiment, when releasing the connection between the motor 51 and the spool 53, a voltage that is equal to or greater than the minimum operating voltage is applied to the motor 51 at start-up of the motor 51. After an average time necessary for the clutch 76 operation elapses, a minimum voltage necessary to maintain the rotation of the rotating shaft 51a is applied to the motor 51. By this means, the number of revolutions of the rotating shaft 51a of the motor 51 does not increase unnecessarily, and it is possible to reduce the sound produced from the motor 51.

With the present embodiment, a higher voltage than the minimum operating voltage is applied to the motor 51 at start-up of the motor 51. Therefore, even when the value of the minimum operating voltage increases due to deterioration of the motor 51, it is possible to reliably release the connection between the motor 51 and the spool 53 by operating the clutch 76.

By the way, the maximum voltage of the voltage signal V varies depending on the environment surrounding the vehicle, the charging condition of the battery, the degree of deterioration, individual variabilities and/or the like. In this case, the drive device 22 may also perform PWM control taking into account the variation of the maximum voltage of the voltage signal V. To be more specific, the drive device 22 compares the maximum voltage $V_H$ to serve as a standard, with the current voltage $V_R$. Next, the drive device 22 calculates time $T_x$ required to drive the voltage signal V to high level using following equation 1. The drive device 22 then controls the voltage to apply to the motor 51 so that the duty ratio of the voltage signal V becomes $T_x/T_5$.

$$T_X = T_6(V_H/V_R) \quad \text{(Equation 1)}$$

By this means, even when the voltage of the battery decreases, it is possible to operate the clutch 76 to reliably release the connection between the motor 51 and the spool 53.

Although the embodiment of the present invention has been described above, the present invention is by no means limited to the above-described embodiment. For example, the clutch 76 may be provided with a spring to detach the pawl 76a from the internal gear 73.

Figure 8:
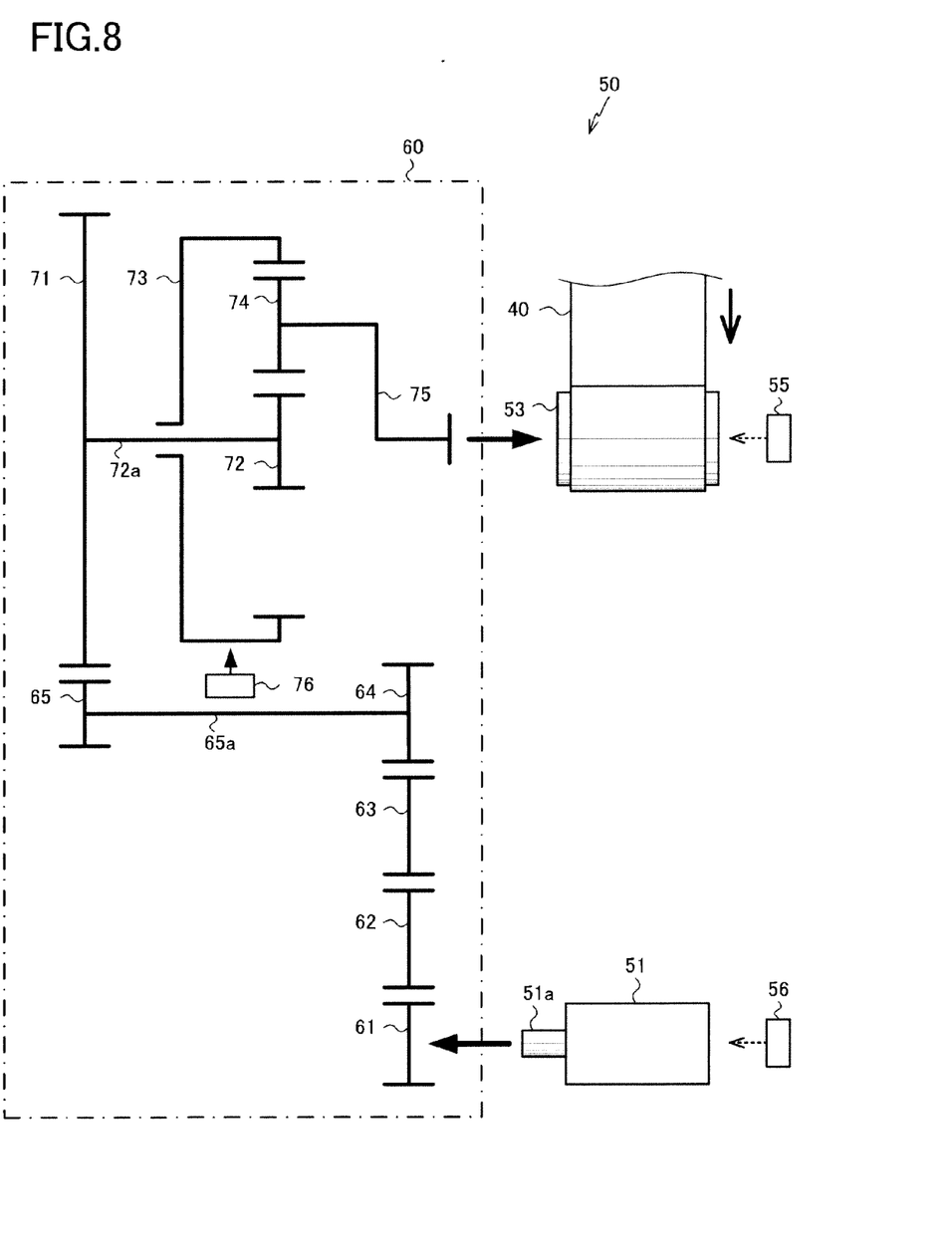
FIG. 8 is a diagram illustrating a modification example of the restraint device.

In the above-described embodiment, as is apparent from FIG. 6, the duty ratio of the voltage signal V is determined such that the duty ratio is $T_6/T_5$ after starting energizing the motor 51 until time $T_2$ elapses, and the duty ratio is $T_7/T_5$ after time $T_2$ elapses. However, this is by no means limiting, and, as illustrated, for example, in FIG. 8, an encoder 56 may be used to directly monitor the rotation of the rotating shaft 51a of the motor 51 and change the duty ratio of the voltage signal V from $T_6/T_5$ to $T_7/T_5$ when the rotating shaft 51a is rotated by an angle necessary to make the clutch 76 off.

In the above-described embodiment, as is apparent from FIG. 6, the duty ratio of the voltage signal V is determined such that the duty ratio becomes $T_6/T_5$ after starting energizing the motor 51 until time $T_2$ elapses and the duty ratio becomes $T_7/T_5$ after time $T_2$ elapses. However, this is by no means limiting, and, the control device 20 may detect the position of the pawl 76a, determine, when detecting that the pawl 76a has rotated up to the position at which the pawl 76a is detached from the internal gear 73, that the clutch 76 is off, and change the duty ratio of the voltage signal V from $T_6/T_5$ to $T_7/T_5$. The position of the pawl 76a may be detected using a detection system such as a limit switch and proximity switch.

Furthermore, instead of changing the duty ratio of the voltage signal V from $T_6/T_5$ to $T_7/T_5$, the power supply to the motor 51 may be stopped.

The control device 20 according to the above-described embodiment may be configured by hardware or may be a computer or microcomputer.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A restraint device for restraining an occupant seated in a seat, comprising:
    a spool that winds up a belt for restraining the occupant;
    a motor that rotates the spool;
    a gear unit that is connected to the spool and the motor so as to transmit a rotation power of the motor to the spool, the gear unit comprising a plurality of gears;
    a clutch that locks or releases one of the plurality of gears of the gear unit through the rotation power of the motor, wherein the clutch locks said one of the plurality of gears when the clutch transmits the rotation power of the motor to the spool, and the clutch releases said one of the plurality of gears when the clutch does not transmit the rotation power of the motor to the spool; and
    a supply unit that supplies an electric power to the motor, wherein when the clutch releases said one of the plurality of gears, the supply unit supplies a first electric power to the motor at start-up of the motor and supplies a second electric power to the motor after the motor starts, the first electric power being greater than the second electric power.

2. The restraint device according to claim 1, wherein the supply unit supplies power to the motor so that an average value of the output voltage when the first power is supplied is greater than an average value of the output voltage when the second power is supplied.

3. The restraint device according to claim 1, wherein the supply unit supplies power to the motor so that the current that is supplied at start-up of the motor is greater than the current that is supplied after the motor starts.

4. The restraint device according to claim 1, wherein the supply unit performs PWM control.

5. The restraint device according to claim 1, wherein the supply unit supplies the first power for a predetermined time.

6. The restraint device according to claim 1, further comprising a first detection system that detects the start-up of the motor,
    wherein the supply unit supplies the first power until the first detection system detects the start-up of the motor.

7. The restraint device according to claim 1, further comprising a second detection system that detects that the motor and the gear unit are disconnected,
    wherein the supply unit stops the power supply when the second detection system detects that the motor and the gear unit are disconnected.

8. The restraint device according to claim 1, further comprising a second detection system that detects that the motor and the gear unit are disconnected,
    wherein, when the second detection system detects that the motor and the gear unit are disconnected, the supply unit supplies power to the motor so that an average value of the output voltage when the first power is supplied is greater than an average value of the output voltage when the second power is supplied.

9. The restraint device according to claim 1, wherein,
    the spool is placed on one side of the seat; and
    the restraint device further comprises:
        a fixing member that is placed on one side of the seat and fixes one end of the belt pulled from a retractor;
        a support member that supports the belt between the spool and the fixing member;
        a buckle that is placed on the other side of the seat; and
        a tongue that is provided in the belt and is attachable and detachable to and from the buckle.

* * * * *